United States Patent [19]

Nachtkamp et al.

[11] 4,452,834
[45] Jun. 5, 1984

[54] PROCESS FOR THE PREPARATION OF AQUEOUS DISPERSIONS OR SOLUTIONS OF POLYURETHANE POLYUREAS CONTAINING HEAT ACTIVATED CROSS-LINKING AGENTS, THE DISPERSIONS OR SOLUTIONS OBTAINABLE BY THIS PROCESS, AND THEIR USE FOR THE PRODUCTION OF COATINGS

[75] Inventors: Klaus Nachtkamp, Cologne; Franz Weider, Leverkusen; Klaus Noll; Josef Pedain, both of Cologne; Klaus Hoehne, Leverkusen, all of Fed. Rep. of Germany

[73] Assignee: Bayer Aktiengesellschaft, Leverkusen, Fed. Rep. of Germany

[21] Appl. No.: 420,172

[22] Filed: Sep. 17, 1982

[30] Foreign Application Priority Data

Sep. 23, 1981 [DE]  Fed. Rep. of Germany ....... 3137748

[51] Int. Cl.$^3$ .......................... B05D 3/02; C08L 75/06
[52] U.S. Cl. ................................. 427/379; 427/388.4; 524/507; 524/539; 524/591; 524/500
[58] Field of Search ............... 524/591, 839, 840, 500; 528/45, 67; 427/379, 388.4, 385.5, 389.8, 393, 412, 435

[56] References Cited

U.S. PATENT DOCUMENTS

| | | | |
|---|---|---|---|
| 3,388,087 | 6/1968 | Dieterich et al. | 260/29.2 |
| 3,461,103 | 8/1969 | Keberle et al. | 260/75 |
| 3,479,310 | 11/1969 | Dieterich et al. | 260/29.2 |
| 3,480,592 | 11/1969 | Dieterich et al. | 260/77.5 |
| 3,686,108 | 8/1972 | Rieff et al. | 260/29.2 |
| 3,756,992 | 9/1973 | Dieterich et al. | 260/77.5 Q |
| 4,046,729 | 9/1977 | Scriven et al. | 260/29.2 TN |
| 4,098,933 | 7/1978 | Burkhardt et al. | 427/379 |
| 4,192,937 | 3/1980 | Noll et al. | 528/59 |
| 4,269,748 | 5/1981 | Nachtkamp et al. | 260/29.2 |
| 4,284,544 | 8/1981 | Wegner et al. | 260/29.2 TN |

FOREIGN PATENT DOCUMENTS

| | | |
|---|---|---|
| 22452 | 4/1980 | European Pat. Off. |
| 2708611 | 5/1978 | Fed. Rep. of Germany |
| 2725589 | 12/1978 | Fed. Rep. of Germany |
| 1148244 | 4/1969 | United Kingdom |

OTHER PUBLICATIONS

D. Dieterich et al., Angew. Chemie, 82, 53, (1970).

*Primary Examiner*—Theodore E. Pertilla
*Attorney, Agent, or Firm*—Gene Harsh; Joseph C. Gil; Thomas W. Roy

[57] ABSTRACT

This invention relates to a new process for the preparation of storage stable aqueous dispersions or solutions of cross-linkable polyurethane polyureas containing heat activated cross-linking agents, in which mixtures of hydrophilically modified prepolymers containing isocyanate groups, hydrophobic polyisocyanates which contain blocked isocyanate groups and are neither soluble nor dispersible in water, and compounds containing at the most one free aminic or hydrazinic primary or secondary amino group and at least one blocked group which under the influence of water forms a free aminic or hydrazinic primary or secondary amino group and a total of at least two such amino groups are prepared in the absence of water and then mixed with water, and it also relates to the aqueous dispersions or solutions obtained by this process and to their use for the production of coatings on heat-resistant substrates.

11 Claims, No Drawings

PROCESS FOR THE PREPARATION OF AQUEOUS DISPERSIONS OR SOLUTIONS OF POLYURETHANE POLYUREAS CONTAINING HEAT ACTIVATED CROSS-LINKING AGENTS, THE DISPERSIONS OR SOLUTIONS OBTAINABLE BY THIS PROCESS, AND THEIR USE FOR THE PRODUCTION OF COATINGS

BACKGROUND OF THE INVENTION

1. Field of the Invention

The present invention relates to a new process for the preparation of aqueous dispersions or solutions of cross-linkable polyurethane polyureas containing cross-linking agents which can be activated by heat, to the dispersions or solutions obtainable by this process and to their use for the production of coatings which have a high resistance to water and solvents, in particular on metal substrates.

2. Description of the Prior Art

Processes for the preparation of aqueous polyurethane polyurea dispersions are known. Those dispersions which are prepared on the principle of incorporating hydrophilic centers (so-called internal emulsifiers) in the macromolecular chain of the polymer (e.g. German Pat. Nos. 1,184,946 and 1,178,586, German Auslegeschrift No. 1,237,306 and German Offenlegungsschriften Nos. 1,495,745, 1,595,602, 1,770,068 and 2,019,324; see also D. Dieterich et al, Angew. Chem. 82, 53 (1970)) are particularly important on account of their exceptional stability and the comparatively high water-resistance of the coatings obtained from them.

Whereas some important manufacturing processes for aqueous polyurethane urea dispersions are dependent on the use of organic solvents, with the disadvantage that these solvents must be removed from the dispersions by expensive distillation processes to be subsequently rectified, other processes are known which enable polyurethane ureas to be prepared in the aqueous phase with little or no solvent.

Particularly elegant processes for the solvent-free preparation of aqueous dispersions or solutions of polyurethane polyureas have been described in German Offenlegungsschrift No. 2,725,589 (corresponding to U.S. application Ser. No. 908,885 of May 24, 1978), German Offenlegungsschrift No. 2,811,148 or U.S. Pat. No. 4,269,748 and German Offenlegungsschrift No. 2,732,131 or U.S. Pat. No. 4,192,937. In these processes, prepolymers which contain isocyanate end groups and which have been hydrophilically modified, i.e. which contain built-in ionic centers and/or external emulsifiers, are mixed with chain lengthening agents in a blocked form which give rise to polyamines or hydrazines under the hydrolytic influence of water. When the resulting mixtures are subsequently mixed with water, the formation of stable aqueous dispersions or solutions of polyurethane polyureas takes place, accompanied and/or followed by a chain lengthening reaction of the isocyanate groups with the hydrolytically formed polyamine or hydrazine.

These processes result in polyurethane ureas which are equal to the products produced by the conventional "solvent process" in their mechanical strength and resistance to hydrolysis and even surpass them in some characteristics which are important for their practical application. The dispersions obtained therefore satisfy the standards of quality required for numerous applications, e.g. for textile coating, where the high flexibility of the substantially linear polyurethane ureas is an advantage.

When non-flexible substrates such as metals are to be coated, it is necessary for certain purposes to use highly cross-linked polymers. This is frequently the case when the lacquers are required to have very high resistance to solvents and other chemical agents and high temperature resistance.

Polymers obtained from the aqueous phase are already in use to some extent even for these fields of application. The polymers used for this purpose are in most cases stoving lacquers based on combinations of polyester or polyacrylate dispersions and, for example, melamine/formaldehyde resins. It would be desirable, however, if systems which have the typical advantages of polyurethane lacquers obtained from organic solution, such as high elasticity and abrasion resistance, excellent resistance to weathering and very high water and solvent resistance were also available in the field of aqueous stoving lacquers.

It was therefore an object of the present invention to provide a solvent-free or low solvent process for the preparation of storage stable aqueous dispersions or solutions of cross-linkable polyurethane polyureas containing cross-linking agents capable of being heat activated, which would be suitable for the production of coatings with improved mechanical properties and increased water-resistance and resistance to hydrolysis.

This problem could be solved by providing the process according to the invention described below which is based on the surprising observation that if, in the processes known in the art for the preparation of aqueous dispersions or solutions of polyurethane polyureas, a mixture of hydrophilically modified isocyanate prepolymers and blocked polyamines or blocked hydrazines are mixed with water, it is possible to incorporate hydrophobic polyisocyanates containing blocked isocyanate groups in the mixture which is to be mixed with water without thereby precipitating the above-mentioned hydrophobic component. This observation was unexpected since it is known, for example, from German Auslegeschrift No. 2,624,442, that in order to incorporate hydrophobic cross-linking agents, in particular blocked polyisocyanates, in previously prepared aqueous polyurethane dispersions, it is necessary to add hydrophilic solvents as solubilizing agents or to use hydrophobic additives in an emulsified form. The possibility discovered according to the invention of incorporating hydrophobic cross-linking agents in the dispersions or solutions without at the same time using hydrophilic solvents or additional emulsifiers is of considerable technical interest since the omission of the above-mentioned hydrophilic auxiliary agents will, of course, increase the water-resistance and resistance to hydrolysis of the sheets or coatings obtained from the dispersions or solutions. For the same reason, the end products according to the invention which are described below are superior to the known aqueous polymer dispersions which contain water-soluble or dispersible blocked polyisocyanates as cross-linking agents (see e.g. German Offenlegungsschrift Nos. 2,456,469 and 2,708,611, European Offenlegungsschrift No. 12,348 or European Offenlegungsschrift No. 22,452).

The aqueous dispersions or solutions obtained by the process according to the invention which is described more fully below also have other unforeseeable technically advantageous properties. Thus they are particularly suitable for the production of stoving lacquers which combine excellent mechanical characteristics with a surprisingly powerful protection against corrosion on metal substrates, even on those which have not been pretreated (e.g. phosphatized). Corrosion protective coatings on metal substrates which have not been pretreated are of considerable technical interest. Another feature which was not foreseeable is that these stoving lacquers manifest their advantageous properties even when they have been hardened at comparatively low temperatures, and the dispersions or solutions obtained from the process according to the invention have an excellent stability against sedimentation even at the elevated temperatures which may occur in transport or storage. It should be particularly emphasized that for the purpose of ensuring that the films or coatings obtained from the dispersions or solutions will have the above-mentioned characteristics, it is not necessary to incorporate special isocyanate reactive groups such as hydroxyl or carboxyl groups in the basic polyurethane polyurea molecule although such groups may, of course, be present.

SUMMARY OF THE INVENTION

The present invention relates to a process for the preparation of storage stable aqueous dispersions or solutions of cross-linkable polyurethane polyureas containing cross-linking agents activated by heat, characterized in that mixtures of (a) prepolymers having at least about 1.8 free isocyanate groups (statistical average) and containing a quantity of chemically incorporated hydrophilic groups and/or external, chemically free emulsifiers sufficient to ensure the dispersibility or solubility of the systems in water, (b) hydrophobic polyisocyanates containing blocked isocyanate groups and neither soluble nor dispersible in water, and (c) compounds containing at the most one free aminic or hydrazinic primary or secondary amino group and at least one blocked group which under the influence of water forms a free aminic or hydrazinic primary or secondary amino group, and a total of at least two at least partially blocked aminic or hydrazinic primary and/or secondary amino groups are prepared in the absence of water and subsequently mixed with water.

The invention also relates to the dispersions or solutions obtained by the process according to the invention.

Lastly, the invention also relates to the use of the dispersions or solutions obtained by the process according to the invention for the production of coatings by coating heat-resistant substrates and removing the water by evaporation and at the same time or subsequently cross-linking the coatings by heat.

DETAILED DESCRIPTION OF THE INVENTION

Starting materials for the process according to the invention are: (a) hydrophilically modified isocyanate prepolymers containing isocyanate end groups, (b) hydrophobic polyisocyanates containing blocked isocyanate groups and (c) hydrazine or organic polyamines having at least partially blocked hydrazinic or aminic amino groups.

Components (a) consist of known isocyanate prepolymers which have (on statistical average) at least about 1.8, preferably at least about 2 isocyanate end groups and contain ionic and/or non-ionic hydrophilic centers and/or are present in combination with external emulsifiers. The preparation of such hydrophilically modified isocyanate prepolymers has been described, for example, in U.S. Pat. No. 4,269,748, herein incorporated by reference, column 3, line 45 to column 7, line 64. The hydrophilically modified isocyanate prepolymers described in these prior publications may also be used as component (a) in the process according to the invention.

The isocyanate prepolymers suitable for the process according to the invention prepared by methods known in the art preferably.

(i) have an average isocyanate functionality of from about 1.8 to 2.8, preferably from about 2 to 2.5, (ii) contain up to about 120, in particular from about 0.1 to 120 and most preferably from about 5 to 70 milliequivalents of built-in cationic or anionic groups per 100 g of solid substance, (iii) contain up to about 30% by weight, in particular up to about 10% by weight, based on the total weight of the prepolymer, of ethylene oxide units present within polyether segments and incorporated in side chains, in end positions and/or within the main chain, and (iv) have an average molecular weight, calculated from the stoichiometry of starting materials, of from about 500 to 10,000, in particular from about 800 to 4000.

Among the preferred isocyanate prepolymers are included those which contain either ionic groups, i.e. in particular carboxylate, sulphonate or ammonium groups, or non-ionic groups of the above-mentioned type or both ionic and non-ionic groups of the above-mentioned type in such quantities within the ranges given that the dispersibility or solubility of the systems according to the invention in water is ensured. It is particularly preferred to use isocyanate prepolymers of this type which contain carboxylate groups and optionally free carboxyl groups and which have been obtained by (partial) neutralization of carboxyl groups with tertiary amines, preferably with aliphatically bound tertiary amino groups before the preparation of the prepolymers (e.g. using (partially) neutralized dihydrocarboxylic acids such as dimethylolpropionic acid as starting components) or after the preparation of the prepolymers (e.g. using free dimethylolpropionic acid). On the other hand, it is also possible in the process according to the invention, in the same way as in U.S. Pat. No. 4,269,748 mentioned above, to use isocyanate prepolymers which do not contain any of the hydrophilic groups mentioned under (ii) and (iii). When using such isocyanate prepolymers in the process according to the invention, the addition of external emulsifiers as indicated in the above-mentioned U.S. Pat. No. 4,269,748 is essential. Mixtures of isocyanate prepolymers conforming to the definitions given above may also be used.

Component (b) used in the process according to the invention consists of known hydrophobic polyisocyanates having blocked isocyanate groups. Examples of such blocked polyisocyanates include diisocyanates such as those which are also suitable for the preparation of the isocyanate prepolymers (a) and which have been disclosed, for example, in U.S. Pat. No. 4,269,748, column 4, lines 10 to 32. Component (b) used according to the invention preferably consists of polyisocyanates having an isocyanate functionality above 2, optionally used in admixture with the above-mentioned diisocyanates. Examples of such higher functional polyisocyanates include tris-(6-isocyanatohexyl)-biuret optionally mixed with its higher homologues, tris-(6-isocyanatohexyl)-isocyanurate as obtained, for example, by the trimerization of hexamethylenediisocyanate according to German Offenlegungsschrift No. 2,839,133, optionally mixed with its higher homologues, and other polyisocyanates containing isocyanurate groups known in the art which may be obtained by the trimerization of aliphatic and/or aromatic diisocyanates such as isophorone diisocyanate, diisocyanatotoluene or mixtures of diisocyanatotoluene and hexamethylenediisocyanate. Polyisocyanates very suitable for use in the blocked form as component (b) are also the known polyisocyanates with urethane groups which may be obtained, for example, by the reaction of excess quantities of 2,4-diisocyanatotoluene or of isophorone diisocyanate with simple polyhydric alcohols in the molecular weight range of from 62 to 300, in particular with trimethylol propane, followed by distillative removal of the unreacted diisocyanate excess, or which may also be obtained in the already blocked form by the method of preparation given below for "blocked polyisocyanate III".

The polyisocyanates exemplified above are used in the blocked form according to the invention. Suitable blocking agents include the compounds conventionally used for blocking polyisocyanates, e.g. phenol, cresol, oximes, lactams such as ε-caprolactam and C—H-acidic compounds such as diethylmalonate, ethylacetoacetate and acetylacetone.

The polyisocyanates mentioned above as examples may also be used in a partially dimerized and partially blocked form since dimerized isocyanate groups (uretdione groups) also constitute blocked isocyanate groups. Any mixtures of blocked polyisocyanates of the type exemplified above may also be used.

Polyisocyanates of the type exemplified above which are blocked with oximes are particularly preferred for use as component (b) in the process according to the invention. Suitable oximes for use as blocking agents for this purpose include, for example, acetone oxime, methyl ethyl ketone oxime (butanone oxime), methylisobutylketone oxime, cyclohexanone oxime, cyclopentanone oxime, acetophenone oxime, benzophenone oxime, formaldoxime and acetaldoxime. Methyl ethyl ketone oxime is particularly preferred as blocking agent. The components (b) used according to the invention are preferably completely blocked polyisocyanates, i.e. compounds which no longer have any free isocyanate groups. In the process according to the invention, such compounds are present in the form of a physical mixture with components (a) and (c). The blocked polyisocyanates are, moreover, hydrophobic, which means that no reactants or auxiliary agents which have hydrophilic properties are used for their preparation. The preparation of the blocked polyisocyanates by reaction of the unblocked polyisocyanates with blocking agents is carried out by the conventional methods used in the art, optionally with the aid of the solvents exemplified below.

Component (c) may consist of any organic compound containing not more than one free aminic or hydrazinic primary or secondary amino group and at least one blocked group which under the influence of water forms a free aminic or hydrazinic primary or secondary amino group, and a total of at least two at least partially blocked aminic or hydrazinic primary or secondary amino groups. Condensation products of hydrazine or of aliphatic or cycloaliphatic, primary or secondary polyamines with ketones or aldehydes conforming to this definition are particularly preferred, i.e. azines, hydrazones, ketimines, aldimines and/or enamines.

Azines and hydrazones suitable for use as component (c) according to the invention include, for example, the compounds described in U.S. Pat. No. 4,269,748, column 7, line 65 to column 8, line 68. The compounds preferably correspond to the following formulae:

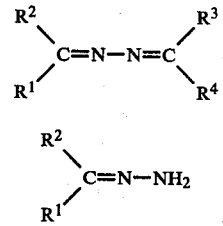

wherein $R^1$, $R^2$, $R^3$ and $R^4$ are identical or different and denote hydrogen or aliphatic hydrocarbon groups having from 1 to 17, preferably from 1 to 15 carbon atoms and the groups $R^1$ and $R^2$ or $R^3$ and $R^4$ together with the carbon atom of the basic structure may also form a cycloaliphatic ring having from 5 to 18, preferably 5 or 6 carbon atoms.

It is preferred to use those compounds corresponding to the above formulae in which the groups $R^1$ to $R^4$ are hydrocarbon groups of the type exemplified above.

The ketimines, aldimines and enamines which are also very suitable starting components (c) are compounds conforming to the above definition such as those disclosed by way of example in German Offenlegungsschrift No. 2,725,589 (corresponding to U.S. patent application Ser. No. 908,885 of May 24, 1978) on page 15, line 5 to page 18, line 24 or which may be obtained from the starting materials exemplified there by the known methods of the art.

The bis-oxazolidines disclosed in U.S. Pat. No. 4,192,936 or any other bis-oxazolidines may also be used as component (c) according to the invention either instead of or in admixture with the compounds containing azine, hydrazone, ketimine, aldimine or enamine groups.

The following compounds are preferred as component (c) according to the invention:
(c1) aliphatic and cycloaliphatic diprimary diamines which are blocked or partially blocked with ketones and which in the unblocked form have a molecular weight of from about 60 to 500, preferably from about 100 to 250 and which contain (on statistical average) at the most about 0.15 free amino groups and at least about 1.85 ketimine groups per molecule, or
(c2) azines and hydrazones based on hydrazine and ketones of the type exemplified.

The last mentioned azines (ketazines) and hydrazones are particularly preferred. Any mixtures of the (partially) blocked polyamines exemplified above may also be used according to the invention.

For carrying out the process according to the invention, mixtures are prepared from components (a), (b) and (c). These components are used in proportions providing from about 0.02 to 3, preferably from about 0.05 to 2 parts by weight of blocked polyisocyanate for each part by weight of isocyanate prepolymer (including any external emulsifier to be used) and from about 0.25 to 2, preferably from about 0.5 to 1.2 blocked or unblocked primary or secondary hydrazinic or aminic amino groups for each free isocyanate group of the isocyanate prepolymer. The three components are mixed at a temperature range of from about −20° C. to 100° C., preferably from about 15° to 70° C. If the individual components or the mixture obtained from them have a high melting point or are highly viscous so that mixing in the preferred temperature range is difficult, the individual components or the mixture of individual components may, of course, be diluted with organic solvents to lower their viscosity.

It is, however, an advantage of the process according to the invention that even in such cases very much less solvent is required than would be necessary, as in previously known processes, for homogeneously dissolving the high molecular weight, chain lengthened polyurethane urea. The use of solvents may also be justified if, for example, film forming or levelling agents are subsequently required in the dispersions for coating purposes. If such solvents are required as auxiliaries, it is often advisable to add them to the mixture before it is dispersed.

These solvents are the same as those which may also be used for the preparation of components (a) and/or (b) and/or (c), e.g. acetone, methyl ethyl ketone, N-methyl-2-pyrrolidone, dimethylformamide, ethylene carbonate, ethyl acetate, ethylene glycol acetate, toluene or xylene. The total quantity of solvent used (including any already used for the preparation of the individual components (a), (b) and (c)) may reach a proportion of up to about 40% by weight, based on the total weight of components (a), (b) and (c), but much smaller quantities are generally sufficient, if required at all. In the absence of grounds of the type mentioned above which would necessitate the use of organic solvents, e.g. high viscosity or the need for film forming auxiliaries, the process according to the invention may be carried out completely solvent-free. Incorporation of the hydrophobic blocked polyisocyanates does not require the addition of any solvent or dispersing agent, as already mentioned above.

When hydrazones or partially blocked polyamines are used as component (c), an exothermic reaction between free amino groups and free isocyanate groups may occur when preparing the mixture, but if the abovementioned conditions concerning the proportion of free amino groups in component (c) are observed, such a reaction will not lead to an unacceptably high increase in viscosity.

It is nevertheless advisable to carry out the preparation of the mixture of (a), (b) and (c) only shortly before the resulting mixture is mixed with water.

The next step of the process according to the invention consists of mixing the mixture with water to prepare the aqueous solution or dispersion and simultaneously hydrolyze the blocked aminic or hydrazinic chain lengthening agents.

The quantity of water used for this step should be limited to the minimum required so that the dispersion will have the highest possible solid content. It is generally quite easy to prepare dispersions having solid contents of from about 40 to 70%. These may easily be further diluted with water, which is preferably added all at once but may be added gradually as desired. Alternatively, mixing of the mixture of components (a), (b) and (c) with water may be carried out by introducing the mixture into the aqueous phase or it may be carried out by a continuous process using suitable mixing apparatus in which components (a), (b) and (c) are first mixed with each other and then with water. The water is used at a temperature of from about 0° to 90° C., preferably from about 20° to 60° C.

The dispersions or solutions may subsequently be further modified in known manner if desired. For example, an additional water-soluble polyamine or hydrazine may be added if the equivalent ratio of NCO groups to (blocked) $NH_2$ or NH groups was so chosen that free NCO groups are still present.

It is advisable to stir the dispersions or solutions for some time after they have been prepared so that any reactions between the individual components and water will be completed. This may be carried out at temperatures in the region of about 20° to 100° C., preferably at about 40° to 80° C.

The question as to whether solutions or dispersions of the polyurethanes in water are obtained in the process according to the invention depends mainly on the molecular weight and the hydrophilic character of the dissolved or dispersed particles, which in turn may be adjusted by suitable choice of the nature and proportions of the starting materials, in particular when preparing the isocyanate prepolymers according to the known principles of polyurethane chemistry.

Due to the dispersing or solubilizing action of the hydrophilically modified polyurethane urea formed from components (a) and (c), the process according to the invention leads to stable dispersions or solutions even when hydrophobic components (b) are used, the term "solutions" used in the context of this invention meaning colloidal disperse system. In general, however, the process according to the invention gives rise to true dispersions and the dispersed particles generally have an average particle diameter of about 20 to 200 nm.

The polyurethane polyurea dispersions or solutions containing cross-linking agents obtained from the process according to the invention are stable in storage without undergoing coagulation or sedimentation even at elevated temperatures. They are eminently suitable for the production of coatings on numerous different substrates such as textiles, leather, flexible plastics, glass fibers, metals, wood or rigid plastics. The dispersions or solutions are particularly suitable, however, as stoving lacquers for heat resistant substrates, in particular for metals. One outstanding property of the stoving lacquers according to the invention is the good protection against corrosion which they afford even on metal substrates which have not been pretreated, for example by phosphatization. To produce the coatings, the dispersions or solutions according to the invention, optionally containing the usual auxiliaries used in lacquer technology, such as pigments, fillers or levelling agents, are applied to the substrates by the usual methods, such as spraying, spread coating or immersion. Hardening by heat is generally carried out at temperatures in the range of from about 80° to 250° C., preferably from about 100° to 180° C., and the water is removed from the lacquer film by evaporation before or during this heat treatment.

The dispersions or solutions according to the invention may, of course, also be mixed with other polymer dispersions or solutions, for example with other polyurethane dispersions or with polyacrylate or alkyd resin dispersions. The mixtures then obtained may also be used for the purposes mentioned above.

The examples given below serve to further illustrate the invention. All percentages given are percentages by weight unless otherwise indicated.

Blocked polyisocyanate I 425 g of butanone oxime are added with cooling to 1000 g of a 90% solution of an isocyanurate polyisocyanate (isocyanate content: 20.5%, solvent: ethyl glycol acetate) obtained by the trimerization of hexamethylene diisocyanate, and the mixture is diluted with 345 g of ethyl glycol acetate and left to react at 60° C. until no isocyanate band (2250 cm$^{-1}$) can be detected in the IR spectrum. The blocked polyisocyanate is obtained in the form of a 75% solution.

Blocked polyisocyanate II

A blocked polyisocyanate free from isocyanate groups is obtained as described above from 1000 g of a biuret-containing polyisocyanate based on hexamethylene diisocyanate (isocyanate content 22.6%), 468 g of methyl ethyl ketone oxime and 490 g of ethyl glycol acetate. The blocked polyisocyanate obtained is in the form of a 75% solution.

Blocked polyisocyanate III 612 g of methyl ethyl ketone oxime are added with cooling to 783 g of diisocyanatotoluene (mixture of 80% 2,4- and 20% 2,6-isomers). The mixture is heated to 100° C. and 96.3 g of trimethylolpropane are added portion-wise. The mixture is then stirred for about 3 hours at 100° to 110° C. until no isocyanate band can be detected in the IR spectrum.

The melt obtained is poured out on to a metal sheet where it solidifies to a vitreous mass on cooling. A blocked polyisocyanate containing urethane groups is obtained in the form of a crystalline powder by crushing this vitreous mass with a mortar.

Blocked polyisocyanate IV 300 g of the polyisocyanate containing biuret groups mentioned in the method of preparation of blocked polyisocyanate II are added to a solution of 3 g of sodium phenolate in 285 g of diethylmalonate. When the exothermic reaction has died down, the reaction mixture is stirred at 70° C. until no isocyanate band can be detected in the IR spectrum. The heated product is diluted with 160 g of ethyl glycol acetate. A 75% solution of blocked polyisocyanate IV is obtained.

EXAMPLES

Example 1

Reaction mixture:
315 g of the polyester of adipic acid and hexanediol (molecular weight 840)
20.1 g of trimethylolpropane
53.6 g of dimethylolpropionic acid
30.3 g of triethylamine
180 g of N-methylpyrrolidone
471.6 g of 4,4'-diisocyanatodicyclohexylmethane
146 g of blocked polyisocyanate I
61.6 g of acetone azine
1190 g of deionized water A clear, homogeneous mixture is prepared at 60° C. from the polyester which has been dehydrated under vacuum at 100° C., the trimethylolpropane, dimethylolpropionic acid, triethylamine and N-methylpyrrolidone. 4,4'-diisocyanatodicyclohexylmethane is added, the temperature is allowed to rise to 85° C. and the reaction mixture is stirred for 2 to 3 hours until the (corrected) isocyanate value is 6.3%[1].

[1]The isocyanate value found by the usual titration with amine and acid is falsified by the triethylamine present in the prepolymer.

The reaction mixture is cooled to 60° C. and the blocked polyisocyanate and acetone azine are added one after the other to the isocyanate prepolymer obtained. At this stage, the temperature drops slightly and the viscosity of the mixture continues to fall. Water is now run in with vigorous stirring, whereupon a finely divided dispersion forms. The dispersion is heated to 60° C. with vigorous stirring, stirring is continued for 3 hours and the reaction mixture is then cooled to room temperature.

The resulting dispersion shows a pronounced Tyndall effect in transmitted light. It has a solid content of 40% and a Ford cup viscosity (4 mm nozzle) of 13 seconds.

The dispersion is stable in storage at room temperature. It may be stored for more than one month at 50° C. without undergoing any significant change in viscosity or particle size.

Clear, high gloss films are obtained on drying. The minimum film forming temperature is just below room temperature (temperature recorded: 10° C. due to the quantity of N-methylpyrrolidone used in the preparation of the dispersion. The films have a lacquer-like handness even when dried only at room temperature. They acquire their optimum mechanical and chemical properties by 30 minutes stoving at about 140° C.

The dispersion is pigmented with a titanium dioxide content of 70% (based on the quantity of binder) and the resulting lacquer is sprayed on steel sheets which have not been treated, i.e. not phosphatized but have only been cleaned with toluene. The characteristics of the lacquers obtained after stoving are shown in the following Table.

| | |
|---|---|
| Stoving conditions | 30 min/140° C. |
| Layer thickness | 30–35 μm |
| Pencil hardness | 3 H |
| Pendulum hardness | 145 sec. |
| Erichsen cupping | 9.9 mm |
| Mandrel bending test (conical mandrel according to ASTM-D-522-60) | >32% |
| Grid section test (according to DIN 53 151) | Gt 0 |
| Water resistance: | |
| Storage at RT | >21 days, lacquer unchanged |
| Storage at 40° C. | >21 days, lacquer unchanged |

Corrosion production test:
The conditions of the salt spray test according to DIN 53 176 were completely fulfilled beyond the required period of 100 hours.

This result shows that the process according to the invention enables aqueous lacquers to be prepared which afford good protection against corrosion even on steel surfaces which have not been phosphatized.

Example 2

A prepolymer is prepared as in Example 1. After cooling to 60° C., there are added, successively, 146 g of blocked polyisocyanate II and 61.6 g of acetone azine, and the reaction mixture is then dispersed as in Example 1. A finely divided dispersion is obtained which shows a strong Tyndall effect in transmitted light. It has a solid content of 40% and a Ford cup viscosity (4 mm nozzle) of 14 seconds. The stability of the dispersion in storage at room temperature and at 50° C. is comparable to that of the dispersion according to Example 1.

The properties of the lacquers obtained from these dispersions are similar to those of the lacquers according to Example 1 except for the slightly lower hardness. The following Table illustrates in the example of the hardness measurements (lacquers pigmented as in Example 1) that the optimum lacquer characteristics are obtained after only 30 minutes stoving at 140° C.

| Stoving conditions | Pendulum hardness | Pencil hardness |
|---|---|---|
| 30 min/120° C. | 119 sec | H |
| 30 min/140° C. | 135 sec | 2 H |
| 30 min/160° C. | 138 sec | 2 H |

Example 3

A prepolymer is prepared according to Example 1. After cooling to 60° C., 87 g of blocked polyisocyanate III followed by 61.6 g of acetone azine are added and the reaction mixture is then dispersed as described in Example 1. A finely divided dispersion is obtained which shows a pronounced Tyndall effect in transmitted light. It has a solid content of 40% and a Ford cup viscosity (4 mm nozzle) of 18 seconds. The stability of the dispersion at room temperature and at 50° C. is comparable to that of the dispersion according to Example 1.

The dispersion dries to form clear, high gloss films which attain their optimum mechanical and chemical properties after only 30 minutes stoving at 100° to 120° C.

The values measured on the clear lacquer are shown in the Table below:

| Stoving conditions | Pendulum hardness | Pencil hardness |
|---|---|---|
| 30 min/100° C. | 142 sec | H |
| 30 min/120° C. | 153 sec | 2 H |
| 30 min/140° C. | 155 sec | 2 H |

The solvent resistance of the lacquer, determined by 5 minutes wetting with toluene, ethyl glycol acetate and acetone, is satisfactory from 30 minutes/100° C. upwards and good from 30 minutes/120° C.

Example 4

A prepolymer is prepared according to Example 1. After cooling to 60° C., 185 g of blocked polyisocyanate IV followed by 61.6 g of acetone azine are added and the reaction mixture is then dispersed as described in Example 1. The resulting dispersion is finely divided and shows a strong Tyndall effect in transmitted light. It has a solid content of about 40% and a Ford cup viscosity (4 mm nozzle) of 14 seconds. The response of the clear lacquer to stoving is shown in the following Table:

| Stoving conditions | Pendulum hardness | Pencil hardness |
|---|---|---|
| 30 min/100° C. | 112 sec | HB |
| 30 min/120° C. | 144 sec | 2 H |
| 30 min/140° C. | 156 sec | 2 H |

The solvent resistance of the lacquer, determined by 5 minutes wetting with toluene, ethyl glycol acetate and acetone, is satisfactory from 30 min/120° C. upwards and good from 30 min/140° C.

Example 5

A prepolymer is prepared as in Example 1. After cooling to 60° C., 39.6 g of acetone hydrazone are added dropwise within 15 minutes, during which the temperature and viscosity rise slightly but there is no risk of gelling. 146 g of blocked polyisocyanate I are then added and the mixture is dispersed as described in Example 1. The resulting dispersion is similar to the dispersion according to Example 1 in its fineness of subdivision and resistance to sedimentation. A dispersion having a solid content of 40% has a Ford cup viscosity (4 mm nozzle) of 20 seconds.

The dispersion dries to form films which after 30 minutes stoving at 140° C. have properties similar to those of the lacquers according to Example 1.

Example 6

A prepolymer is prepared according to Example 1. After cooling to 60° C., there are added, successively, 50 g of a ketimine of isophorone diamine and methylisobutylketone (98% of amino groups are blocked), 44.8 g of acetone azine and 146 g of blocked polyisocyanate I, and the mixture is then dispersed as described in Example 1. The resulting dispersion is finely divided and shows a strong Tyndall effect in transmitted light. It has a solid content of about 40% and a Ford cup viscosity (4 mm nozzle) of 24 seconds.

The lacquers obtained from this dispersion by drying and 30 minutes stoving at 140° C. are similar to those of Example 1.

Example 7

Reaction mixture:
315 g of adipic acid/hexanediol polyester (molecular weight 840)
20.1 g of trimethylolpropane
53.6 g of dimethylolpropionic acid
30.3 g of triethylamine
288.2 g of 4,4'-diisocyanatodicyclohexylmethane
184.8 g of hexamethylene diisocyanate
87 g of blocked polyisocyanate III
94.1 g of acetone azine
1365 g of deionized water A clear, homogeneous mixture is prepared at 90° C. from the polyester which has been dehydrated under vacuum at 100° C., the trimethylolpropane, dimethylolpropionic acid and triethylamine. The reaction mixture is cooled, the two diisocyanates are added one after the other and the mixture is stirred at 60° C. until a (corrected) isocyanate value of 11.3% is obtained. The blocked polyisocyanate and acetone azine are added one after the other to the resulting isocyanate prepolymer, and water heated to 60° C. is then run in with vigorous stirring. Stirring is continued for 3 hours at 60° C. and the reaction mixture is then cooled to room temperature. The resulting dispersion is finely divided and shows a strong Tyndall effect in transmitted light. In its resistance to sedimentation it is similar to the dispersion according to Example 1. The Ford cup viscosity (4 mm nozzle) is 26 seconds at a solid content of 40%.

This example illustrates that the process according to the invention may be carried out completely without organic solvent and that dispersions which are stable to sedimentation may be obtained by this method.

The dispersion described above dries at room temperature to a film with a distinct crazed structure. If 10% by weight of ethyl glycol or N-methylpyrrolidone is added to the dispersion as film forming additive, the minimum film forming temperature falls below 0° C. and a smooth, homogeneous film is obtained. After 30 minutes stoving at 120° C., the lacquer has a pendulum hardness of 125 seconds and pencil hardness H.

Example 8

Reaction mixture:
170 g of adipic acid/hexanediol/neopentylglycol polyester (molar ratio of the glycols=1,62:1, molecular weight of the polyester=1700)
231 g of adipic acid/hexanediol polyester (molecular weight 840)
20.1 g of trimethylolpropane
107.2 g of dimethylolpropionic acid
55.6 g of triethylamine
350 g of N-methylpyrrolidone
471.6 g of 4,4'-diisocyanatodicyclohexylmethane
1022 g of blocked polyisocyanate I
44.8 g of acetone azine
1980 g of deionized water An isocyanate prepolymer (corrected isocyanate value: 2.4%) is prepared as described in Example 1 from the polyesters, trimethylolpropane, dimethylolpropionic acid, triethylamine, N-methylpyrrolidone and diisocyanatodicyclohexylmethane. The reaction mixture is cooled to 70° C. and the blocked polyisocyanate and acetone azine are added. Water is then run in with vigorous stirring, whereupon a finely divided dispersion forms. This dispersion is then stirred for a further 3 hours at 60° C. and cooled to room temperature.

The resulting dispersion has a Ford cup viscosity (4 mm nozzle) of 14 seconds at a solid content of 40%. It shows a strong Tyndall effect in transmitted light and has a high stability to sedimentation similar to that of the dispersion from Example 1.

This example shows that the process according to the invention is capable of producing stable dispersions in which the content in hydrophobic cross-linking agents is of the same order as the content in hydrophilic polyurethane urea or, as described in Example 9 below, it may even greatly exceed the polyurethane urea content.

Example 9

Reaction mixture:
170 g of adipic acid/hexanediol/neopentyl glycol polyester (as in example 8)
231 g of adipic acid/hexanediol polyester (molecular weight 840)
20.1 g of trimethylolpropane
107.2 g of dimethylolpropionic acid
80.8 g of triethylamine
350 g of N-methylpyrrolidone
471.6 g of 4,4'-diisocyanatodicyclohexylmethane
3102 g of blocked polyisocyanate I
44.8 g of acetone azine
3770 g of deionized water An isocyanate prepolymer (corrected isocyanate value 2.3%) is prepared as in Example 8. The prepolymer is cooled to 70° C. and the blocked polyisocyanate and the acetone azine are added. Water is then run in with vigorous stirring. The resulting dispersion is then stirred for 3 hours at 60° C. and cooled to room temperature.

The dispersion is distinctly less finely divided than the dispersion according to Example 8 but gives a perceptible Tyndall effect in transmitted light and is stable to sedimentation for longer than three months at room temperature. The Ford cup viscosity (4 mm nozzle) is 13 seconds at a solid content of 40%.

Example 10

Reaction mixture:
483 g of adipic acid/hexanediol polyester (molecular weight 840)
20.1 g of trimethylolpropane
85 g of propoxylated adduct of 2-butenediol-(1,4) and NaHSO$_3$ (molecular weight 425)
100 g of N-methylpyrrolidone
366.8 g of 4,4'-diisocyanatodicyclohexylmethane
67.2 g of hexamethylenediisocyanate
210 g of blocked polyisocyanate IV
62.7 g of acetone azine
1600 g of deionized water The two isocyanates are added to the dehydrated polyester, the trimethylolpropane, the bisulphite adduct and N-methylpyrrolidone, and the reaction mixture is stirred at 100°–110° C. until an isocyanate value of 6.0% is obtained. The resulting isocyanate prepolymer is cooled to 75° C. The blocked polyisocyanate and acetone azine are added successively. Water is then run in with vigorous stirring and the reaction mixture is stirred for a further 3 hours at 60° C. and then cooled to room temperature. The resulting dispersion shows a strong Tyndall effect in transmitted light. It has a solid content of 40% and a Ford cup viscosity (4 mm nozzle) of 28 seconds. The solid substance contains 16.7 milliequivalent % of sulphonate groups.

The dispersion is suitable for coating flexible substrates such as, for example, PVC coated textiles. After thermal cross-linking, the coatings have good solvent resistance and in particular good resistance to chemical cleaning agents. An indication of this is given by the swelling values of the films obtained from the dispersion (2 hours' storage in trichloroethylene at room temperature):

| Film | Increase in volume by swelling in trichloroethylene |
|---|---|
| Drying at 80° C. | 600% |
| Drying at 80° C. + 5 min at 160° C. | 175% |

Example 11

Reaction mixture:
1224 g of adipic acid/hexanediol/neopentyl glycol polyester (as in example 8)
85.5 g of a polyester of 85% ethylene oxide and 15% propylene oxide started on n-butanol (molecular weight 2150)
110.5 g of a propoxylated adduct of 2-butenediol-(1,4) and NaHSO$_3$ (molecular weight 425)
222 g of isophorone diisocyanate
168 g of hexamethylenediisocyanate
219 g of blocked polyisocyanate I 167 g of a ketimine of isophorone diamine and methyl isobutyl ketone (98% of the amino groups blocked)
2960 g of deionized water
7.5 g of hydrazine hydrate The isophorone diisocyanate and hexamethylene diisocyanate are added to the dehydrated mixture of polyester, polyether and bisulphite adduct, and the reaction mixture is stirred at 110° C. until an isocyanate value of 4.6% is obtained. The reaction mixture is then cooled to 70° C. and the blocked polyisocyanate followed by the ketimine is added to the resulting isocyanate prepolymer. Water to which hydrazine hydrate has been added is then run in with vigorous stirring and the mixture is stirred for a further 3 hours at 60° C. and then cooled to room temperature.

The resulting dispersion shows a strong Tyndall effect in transmitted light. It has a solid content of 40% and a Ford cup viscosity (4 mm nozzle) of 15 seconds. The solid content contains 12.6 milliequivalent % of sulphonate groups and 3.3% by weight of polyethylene oxide segments.

The dispersion is suitable for use as adhesive layer for coating textiles. The coatings obtained are distinguished by their very high resistance to chemical cleaning agents.

Example 12

A prepolymer is prepared according to Example 11. After cooling to 70° C., there are added, successively, 292 g of blocked polyisocyanate I and 243 g of a bisoxazolidine corresponding to the formula

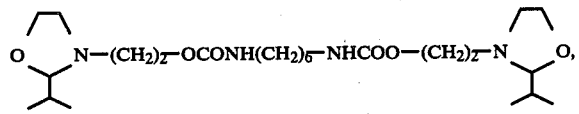

and the reaction mixture is dispersed with 3060 g of water as described in Example 11. The dispersion obtained is finely divided and shows a strong Tyndall effect in transmitted light. It has a Ford cup viscosity (4 mm nozzle) of 18 seconds and a solid content of 40%.

Textile coatings which have been prepared with the aid of this dispersion used as adhesive layer have a very high resistance to chemical cleaning agents.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of aqueous dispersions or solutions of cross-linkable polyurethane polyureas which are stable in storage and contain cross-linking agents capable of being activated by heat, which comprises preparing a mixture containing
    (a) prepolymers having at least about 1.8 free isocyanate groups (on statistical average) and containing a quantity of chemically incorporated hydrophilic groups and/or external, non-chemically bound emulsifiers sufficient to ensure the dispersibility or solubility of the systems in water,
    (b) hydrophobic polyisocyanates which have blocked isocyanate groups and are neither soluble nor dispersible in water, and
    (c) compounds having at the most one free aminic or hydrazinic primary or secondary amino group and at least one blocked group which under the influence of water forms a free aminic or hydrazinic primary or secondary amino group, and a total of at least 2 at least partially blocked aminic or hydrazinic primary and/or secondary amino groups in the absence of water and subsequently mixing said mixture with water.

2. The process according to claim 1 wherein said aqueous dispersions or solutions are free from external emulsifiers.

3. The process according to claim 2 wherein component (a) contains chemically built-in carboxylate and optionally carboxyl groups.

4. The process according to claim 2 or 3, wherein blocked polyisocyanates having an average isocyanate functionality greater than 2, based on the isocyanate groups which can be reactivated by heat, are used as component (b).

5. The process according to claim 4, wherein polyisocyanates having oxime-blocked isocyanate groups are used as component (b).

6. The process according to claim 2 or 3, wherein compounds containing azine, hydrazone, ketimine, aldimine and/or enamine groups are used as component (c).

7. The process according to claim 4 wherein components (a), (b) and (c) are used in quantities corresponding to a proportion by weight of (a):(b) of about 1:0.02 to 1:3, and an equivalent ratio of isocyanate groups of prepolymer (a):at least partially blocked aminic and/or hydrazinic primary or secondary amino groups of (c) of about 1:0.25 to 1:2.

8. The aqueous dispersions or solutions obtained according to claim 1.

9. The aqueous dispersions or solutions obtained according to claim 4.

10. The aqueous dispersions or solutions obtained according to claim 7.

11. The process of coating a heat resistant substrate which comprises coating said substrate with the aqueous dispersion or solution of claim 7, removing the water by evaporation or vaporization, and simultaneously or subsequently cross-linking the coating by heat.

* * * * *